J. HAINES.
PLANTER.
APPLICATION FILED OCT. 31, 1919.
1,354,039.
Patented Sept. 28, 1920.
2 SHEETS—SHEET 2.
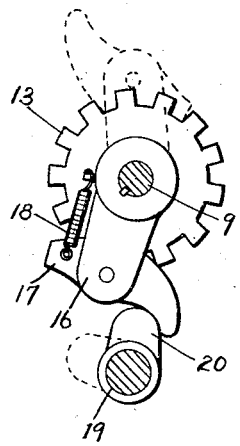
Fig. IV.
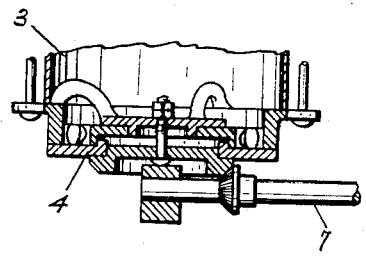
Fig. V.
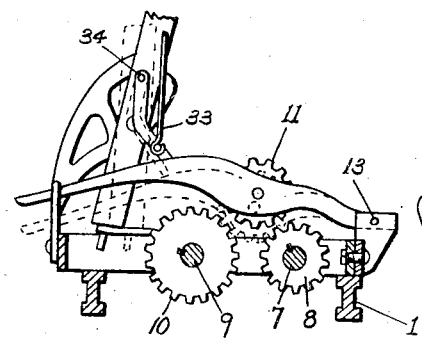
Fig. VI.
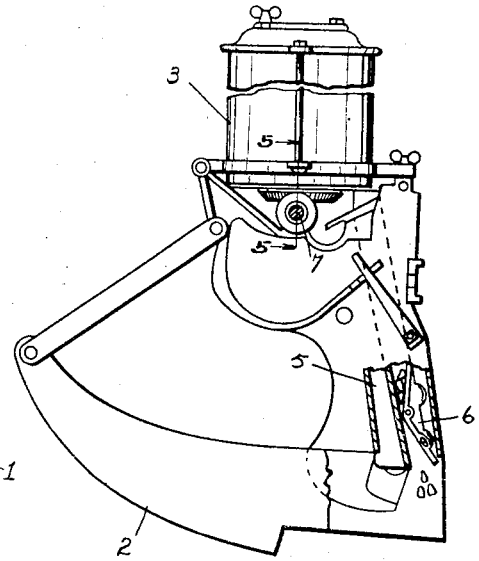
Fig. VII.
Witnesses
Kenn Gilman
Fred Ullrich
Inventor
Joseph Haines
By Chappell & Earl
Attorneys

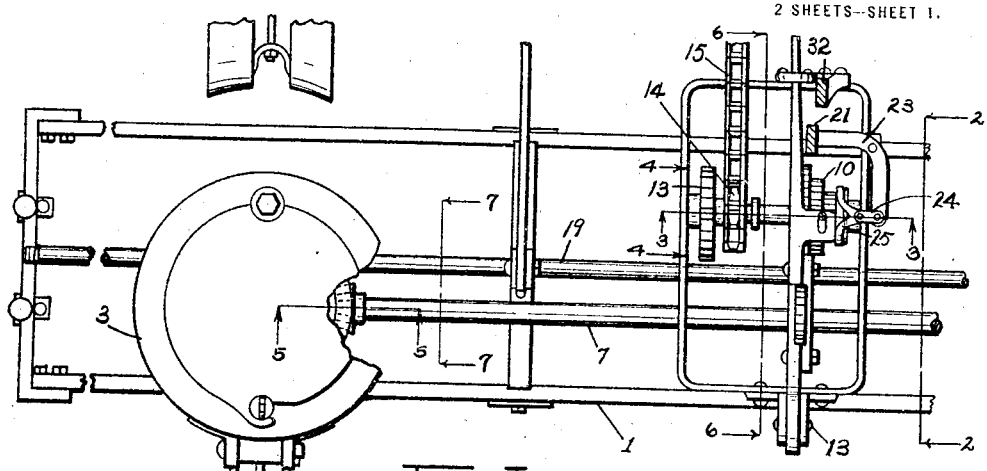
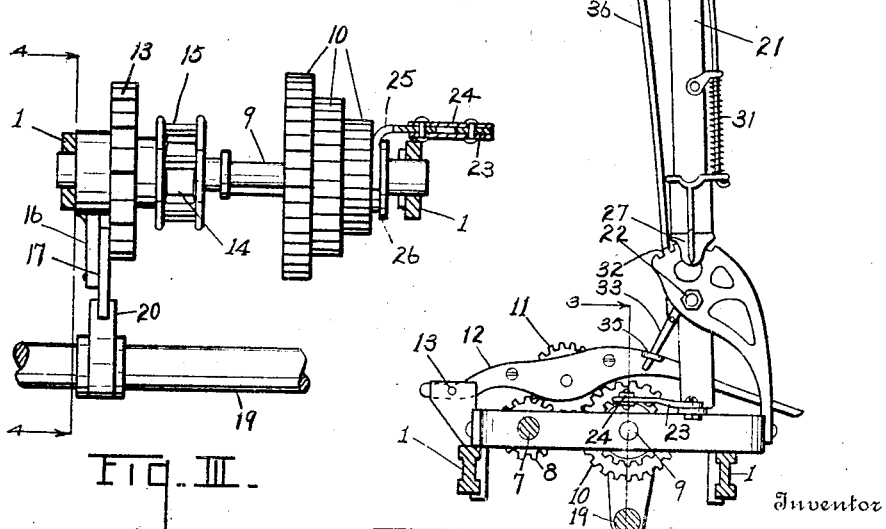

UNITED STATES PATENT OFFICE.

JOSEPH HAINES, OF LAWTON, MICHIGAN.

PLANTER.

1,354,039.  Specification of Letters Patent.  Patented Sept. 28, 1920.

Application filed October 31, 1919. Serial No. 334,837.

*To all whom it may concern:*

Be it known that I, JOSEPH HAINES, a citizen of the United States, residing at Lawton, county of Van Buren, State of Michigan, have invented certain new and useful Improvements in Planters, of which the following is a specification.

This invention relates to improvements in planters.

The main object of this invention is to provide an improved construction for a check row corn planter in which the number of kernels of corn or seeds dropped may be accurately controlled and changed or varied without stopping the machine.

A further object is to provide a structure having these advantages which is simple and economical and not likely to get out of repair in use.

Still further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a detail plan view of a planter embodying the features of my invention, such parts only being shown as are deemed desirable to illustrate an adaptation of my improvements.

Fig. II is a vertical section on a line corresponding to line 2—2 of Fig. I.

Fig. III is an enlarged view partially in section on a line corresponding to line 3—3 of Fig. I.

Fig. IV is an enlarged detail section on a line corresponding to line 4—4 of Figs. I and III.

Fig. V is a detail view partially in section on a line corresponding to line 5—5 of Figs I and VII, showing details of the feed mechanism.

Fig. VI is a detail section on a line corresponding to line 6—6 of Fig. I with the connecting gear or idler disengaged.

Fig. VII is a detail view partially in section on a line corresponding to line 7—7 of Fig. I, parts being broken away.

In the drawings similar reference characters refer to similar parts throughout the several views, and the sectional views are taken looking in the direction of the little arrows at the ends of the section lines.

Referring to the drawing, 1 represents the main frame of the machine, 2 one of the shoes or furrow openers, 3 a seed hopper and 4 the feed mechanism generally which is adapted to drop the seeds one by one into the boot 5 from which they are discharged into the furrow, the discharge being controlled by the gate 6. As the details of these parts form no part of my present invention, they are not further described herein.

The feed mechanism is driven by the shaft 7 having a gear 8 thereon. The driving shaft 9 is disposed parallel to the feed shaft and is provided with a plurality of gears 10 of different diameters or different numbers of teeth. These driving gears 10 are connected to the gear 8 of the feed shaft by means of the idler or connecting gear 11. This gear 11 is carried by a support 12 pivoted at 13 so that the support may be raised to disengage the connecting gear, as shown in Fig. VI. The gears 10 are splined to the driving shaft 9 so that they may be shifted thereon to aline any one of them with the connecting gear 11.

Rotatably mounted on the shaft 9 is a toothed driving wheel 13 having a sprocket 14 connected thereto and connected to a source of power by the sprocket chain 15 so that the driving wheel is continuously driven.

An arm 16 carrying the driving pawl 17 is keyed to the shaft 9. This pawl 17 is moved into engagement with the wheel 13 by the spring 18.

The check row rock shaft 19 is provided with a trip arm 20 which when in its normal position, as shown by full lines in Fig. IV, engages the pawl 17 holding it from the wheel 13 and thereby preventing rotation of the shaft 9. When the check row rock shaft 19 is actuated to the position shown by dotted lines in Fig. IV, the pawl is released from the arm 20 and forced into engagement with the wheel 13 by its spring and the shaft 9 is driven one complete revolution, the check row shaft being returned to its initial position so that the driving shaft is released or stopped by reëngagement of the pawl 17 with the arm 20 when its revolution is completed.

The extent to which the feed shaft 7 is rotated depends upon the driving gear with which the connecting gear 11 is meshed thereby securing variation in feed. To conveniently adjust or control this variation in feed, I provide a hand lever 21 which is pivoted at 22 and connected by the bell crank lever 23, and the link 24 to the yoke 25 engaging the grooved collar 26 connected to gears 10 so that as the lever is moved back and forth, the gears are shifted on the shaft 9 to bring the desired gear into alinement with the connecting gear 11. This lever 21 is provided with a detent 27 connected by the link 28 to the hand-piece 29 pivoted at 30 on the lever. The spring 31 urges the detent into engagement with the toothed segment 32.

To release the connecting gear, I mount an arm or lever 33 on the pivot 34 carried by the lever 21. This lever 33 slidably engages a loop or eye 35 on the suport 12. The lever 33 is connected by the link 36 to the hand-piece 29 so that when the hand-piece is actuated to release the detent 27, the support 12 is raised to disengage the gear 11 thereby freeing the gears 10 so that they may be shifted to the desired position.

The parts of this mechanism are simple and economical to produce, are durable in use and the machine is easily adjusted to accomplish its end.

I have illustrated but a single adaptation of my improvement as I believe the disclosure made will enable those skilled in the art to which my invention relates to embody or adapt the same as may be desired.

Having thus described my invention, what I claim as new and desire to secure by Letters Patent, is:

1. In a structure of the class described the combination of a driven shaft, a driving shaft, a driving wheel rotatably mounted on said driving shaft, a pawl carried by said driving shaft coacting with said driving wheel, a rock shaft provided with a trip normally disengaging said pawl, a set of driving gears of different diameters splined upon said driving shaft, a gear on said driven shaft, a connecting gear adapted to mesh with said driven shaft gear and with the driving gear alined therewith, a pivoted support for said connecting gear whereby it may be lifted out of mesh to permit the shifting of said driving gears, a shifting lever for said driving gears provided with a detent, a coacting segment and a pivoted hand-piece connected to said detent, and a link connecting said hand-piece to said connecting gear support whereby said connecting gear is lifted out of mesh to permit the shifting of said driving gears when said lever detent is released.

2. In a structure of the class described, the combination of a driven shaft, a driving shaft, a driving wheel rotatably mounted on said driving shaft, a pawl carried by said driving shaft coacting with said driving wheel, a rock shaft provided with a trip normally disengaging said pawl, a set of driving gears of different diameters splined upon said driving shaft, a gear on said driven shaft, a connecting gear adapted to mesh with said driven shaft gear and with the driving gear alined therewith, a pivoted support for said connecting gear whereby it may be lifted out of mesh to permit the shifting of said driving gears, and means for disconnecting said connecting gear and shifting said driving gears.

3. In a structure of the class described, the combination of a driven shaft, a driving shaft, a set of driving gears of different diameters splined upon said driving shaft, a gear on said driven shaft, a connecting gear adapted to mesh with said driven shaft gear and with the driving gear alined therewith, an adjustable support for said connecting gear whereby it may be disengaged to permit the shifting of said driving gears, a shifting lever for said driving gears provided with a detent, a coacting segment and a pivoted hand-piece connected to said detent, and a link connecting said hand-piece to said connecting gear support whereby said connecting gear is lifted out of mesh to permit the shifting of said driving gears when said lever detent is released.

4. In a structure of the class described, the combination of a driven shaft, a driving shaft, a set of gears of different diameters splined upon said driving shaft, a gear on said driven shaft, a connecting gear adapted to mesh with said driven shaft gear and with the driving gear alined therewith, an adjustable support for said connecting gear whereby it may be engaged to permit shifting of said driving gears, a shifting lever for said driving gears provided with a detent, a coacting segment and pivoted hand piece connected to said detent, a lever pivotally mounted on said shifting lever and having sliding engagement with said support, and a link connecting said hand piece to said second lever whereby said connecting lever is lifted out of mesh to permit the shifting of said driving levers when said detent is released.

In witness whereof, I have hereunto set my hand and seal in the presence of two witnesses.

JOSEPH HAINES. [L. S.]

Witnesses:
 CLARENCE E. BROOKS,
 J. L. HALL.